United States Patent [19]
Numata et al.

[11] Patent Number: 6,147,679
[45] Date of Patent: Nov. 14, 2000

[54] MOUSE-TYPE INPUT DEVICE

[75] Inventors: Tetsu Numata, Fukushima-ken; Hiromi Chiba, Kanagawa-Ken, both of Japan

[73] Assignee: Alps Electric Co., Ltd., Tokyo, Japan

[21] Appl. No.: 09/016,579

[22] Filed: Jan. 30, 1998

[30] Foreign Application Priority Data

Jan. 31, 1997 [JP] Japan .................................. 9-019486

[51] Int. Cl.⁷ .............................. G09G 5/08; A63F 9/24; G06F 3/033
[52] U.S. Cl. .............................................. 345/163; 463/37
[58] Field of Search ................................ 345/163, 167; 463/37

[56] References Cited

U.S. PATENT DOCUMENTS

| | | | |
|---|---|---|---|
| 5,280,276 | 1/1994 | Kwok | 345/167 |
| 5,287,090 | 2/1994 | Grant | 345/163 |
| 5,379,053 | 1/1995 | Steinberg | 345/157 |
| 5,854,482 | 12/1998 | Bidiville et al. | 250/221 |
| 5,926,167 | 7/1999 | Niitsuma et al. | 345/156 |

FOREIGN PATENT DOCUMENTS

| | | | |
|---|---|---|---|
| 3-30911 | 6/1991 | Japan . | |
| 2266759 | 10/1993 | United Kingdom | G09F 23/00 |

OTHER PUBLICATIONS

See–through Mouse, Suncom, Niles, Illinois, Mar. 1992.
ClearCase Mouse, PC–Computing, v1, n5, p143, Dec. 1988.

*Primary Examiner*—Mark R. Powell
*Assistant Examiner*—Ryan Yang
*Attorney, Agent, or Firm*—Brinks Hofer Gilson & Lione

[57] ABSTRACT

A mouse has a ball, a rotation detecting section for detecting the rotation of the ball, and a casing for containing the ball and the rotation detecting section. A hole is formed at a position on the upper surface of the casing directly above the ball, and covered with a transparent acrylic plate. This structure allows the operator to make certain, during operation, that the ball is smoothly rotating. The ball is placed offset toward the leading end of the mouse.

2 Claims, 2 Drawing Sheets

MOUSE-TYPE INPUT DEVICE

BACKGROUND OF THE INVENTION

1. Field of the Invention

The present invention relates to an input device for inputting two-dimensional information, such as coordinates and directions on a screen, into a storage and processing apparatus such as a personal computer, and more particularly, to a mouse.

2. Description of the Related Art

As an input device for inputting two-dimensional information into a storage and processing apparatus such as a personal computer, a mouse, a trackball, a joy stick, and the like are widely used. With regard to the mouse, when the operator moves the mouse on an operation surface, such as a desk, a ball contained in a casing rotates, the direction and amount of rotation are mechanically detected, and two-dimensional information corresponding to the moving amount and direction of the mouse is given to the storage and processing apparatus.

Therefore, if the ball of the mouse does not rotate smoothly, two-dimensional information that the operator desires is not output from the mouse. In general, the ball is made of a material that produces large friction with the operation surface, such as rubber. The ball made of a material of this type is easy to rotate smoothly, while dust and dirt on the operation surface are prone to adhere onto the surface of the ball. If dust and dirt are deposited between the ball and a rotation detecting section, the rotation of the ball is not reliably transmitted to the rotation detecting section, and the input of desired two-dimensional information is impossible, for example, a cursor on the screen does not move no matter how the operator moves the mouse.

When desired two-dimensional information cannot be input as mentioned above, the operator cannot immediately know why the input trouble has occurred, that is, whether the input has been disabled due to unsmooth rotation of the ball, or due to the trouble caused in a wiring system or the storage and processing apparatus. Accordingly, when trouble occurs in the conventional mouse, the operator removes a cover plate mounted at the bottom of the casing of the mouse, and checks to see if dust and dirt are adhering onto the ball or the rotation detecting section. If dust and dirt are adhering, they are removed by cleaning.

It is, however, troublesome to remove the cover plate at the bottom of the casing and to perform checking and cleaning every time trouble of this type occurs. Even if no dust and dirt are adhering, the structure of the conventional mouse makes it difficult to actually verify that the ball can smoothly rotate in operation. Furthermore, in recent years, personal computers and the like have become widespread for home use, and have also been used by persons that are not accustomed to such apparatuses. Therefore, such persons cannot remedy trouble unless they discover that it is necessary to check the ball section. In addition, there is a demand that the cause of trouble be determined more easily.

SUMMARY OF THE INVENTION

The present invention has been made to solve the above problems, and has as an object the provision of an input device having such a structure that it is always possible to easily make certain that the input device is used in a good condition.

In order to achieve the above object, an input device of the present invention comprises a rotatable ball, a rotation detecting section for detecting the amount and direction of rotation of the ball and generating a signal in accordance with the detected amount and direction, and a casing for containing the ball and the rotation detecting section, wherein a hole for visually recognizing the ball therethrough is formed at a position on the upper surface of the casing directly above the ball.

In the input device of the present invention, a hole is formed at a position on the upper surface of the casing directly above the ball, as distinct from the conventional structure in which the ball is completely covered with the casing. Since this structure allows the ball to be visually recognized from above through the hole, the operator can check the rotating condition of the ball while normally operating the input device.

It is preferable in this input device that the hole of the casing be covered with a transparent plate. In this case, visual recognition of the ball is not disturbed, and dust and dirt are prevented from coming into the casing from above.

Moreover, the diameter of the hole may be larger than that of the ball, and the transparent plate may be detachable from the casing. For example, in checking and cleaning of the ball, it is thereby possible to take the ball out of the upper side of the casing after detaching the transparent plate from the casing.

Furthermore, the ball may be offset from the center of the entire input device toward the leading end. In this case, since the ball is positioned on the side of the fingers of the operator, the rotating condition of the ball can be checked more easily. Still furthermore, when the input device is operated by moving the hand centered on the wrist laid on the desk, even a slight movement of the hand can easily rotate the ball and input desired two-dimensional information.

DESCRIPTION OF THE PREFERRED EMBODIMENT

An embodiment of the present invention will be described below with reference to FIGS. 1 and 2.

Figure 1:
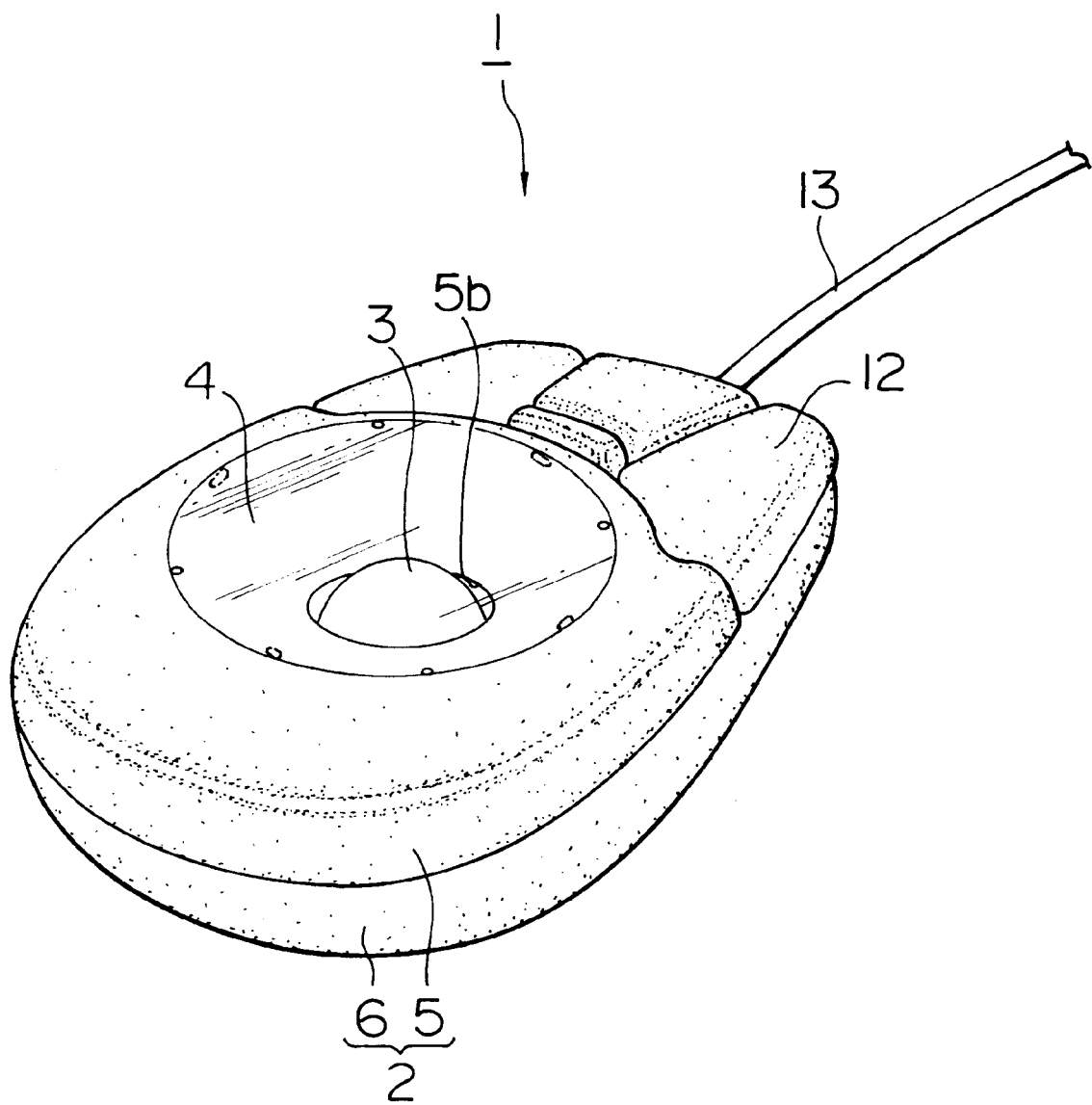
FIG. 1 is a perspective view of a mouse according to an embodiment of the present invention.
Figure 2:
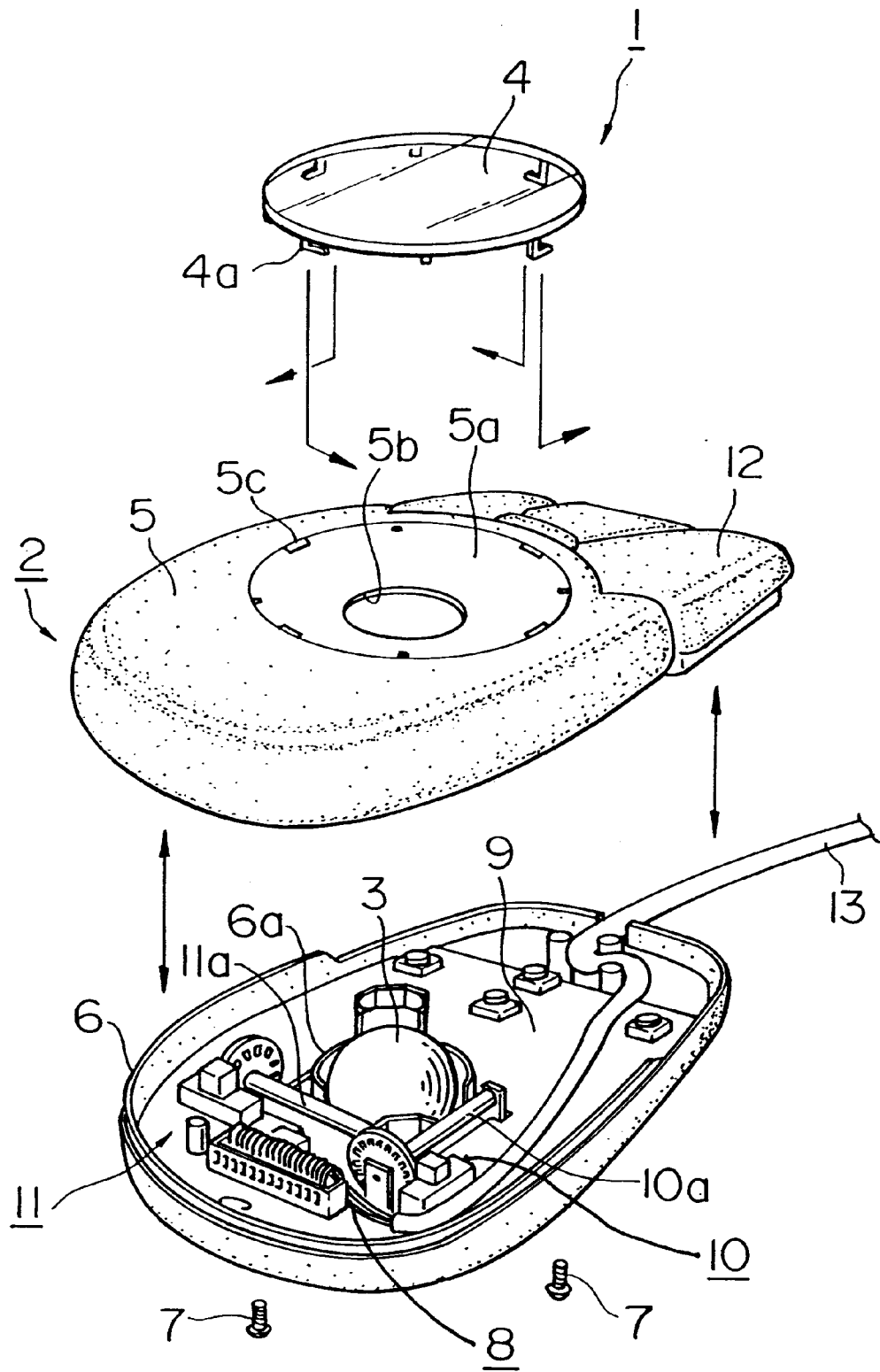
FIG. 2 is an exploded perspective view of the mouse.

FIG. 1 is a view of a mouse (input device) 1 according to the embodiment of the present invention, and FIG. 2 is an exploded view of the mouse 1. In these figures, numerals 2, 3, and 4 denote a casing, a ball, and a transparent acrylic plate (transparent plate), respectively.

As shown in FIG. 2, the casing 2 is composed of an upper casing 5 and a lower casing 6 which are fixed by screws 7 from below. An almost cylindrical wall section 6a is provided at the center inside the lower casing 6, and the ball 3 is rotatably contained therein. A shallow concave section 5a shaped like an inverse cone is provided at the center on the upper surface of the upper casing 5, and a hole 5b for visually recognizing the ball 3 therethrough is formed at the center of the concave section 5a. The hole 5b is positioned directly above the ball 3, and the diameter of the hole 5b is smaller than that of the ball 3.

The circular transparent acrylic plate 4 is fitted on the concave section 5a of the upper casing 5. L-shaped fitting projections 4a are formed at four positions on the lower rim of the transparent acrylic plate 4, and slots 5c are formed at positions corresponding thereto on the rim of the concave section 5a of the upper casing 5. The transparent acrylic plate 4 is fixed on the upper casing 5 by inserting the fitting projections 4a of the transparent acrylic plate 4 into the slots 5c and turning the transparent acrylic plate 4 counterclockwise.

The casing 2 also contains, besides the ball 3, a substrate 9 on which a rotation detecting section 8 for detecting the rotation of the ball 3 is mounted. Specifically, the rotation detecting section 8 comprises an X-direction rotary encoder 10, a Y-direction rotary encoder 11, and the like. When rollers 10a and 11a of the rotary encoders 10 and 11 make contact with the ball 3 at cutouts of the wall section 6a, the rotation of the ball 3 is transmitted to the rollers 10a and 11a, and the amounts and directions of rotation of the rollers 10a and 11a are respectively detected, signalized, and output to a storage and processing apparatus by the rotary encoders 10 and 11.

The mouse 1 is further provided with a switch 12 for inputting a selection signal and the like, a cable 13 for making connection to the storage and processing apparatus, and the like.

After assembly, the top of the ball 3 slightly projects from the hole 5b of the upper casing 5, as shown in FIG. 1. In this embodiment, the position of the ball 3 is offset from the center of the entire mouse 1 toward the switch 12 (toward the leading end of the mouse 1).

According to the above-mentioned structure of the mouse 1, since the ball 3 can be visually recognized from above, the operator can make certain, in a normal operation, that the ball 3 is smoothly rotating, and can normally use the mouse 1 without any anxiety. Even if trouble occurs, for example, if a cursor on a screen does not move when the mouse 1 is moved, the operator can easily know whether or not the trouble is caused by rotation failure of the ball 3, and can properly cope with the trouble.

Since the hole 5b of the casing 2 is covered with the transparent acrylic plate 4, visible recognition of the ball 3 is not disturbed, and dust and dirt do not enter the casing 2 from above. In addition, since it is possible to always see how dirty the ball 3 is, cleaning can be performed at a proper time.

The ball of the conventional mouse is positioned near the center or relatively near the rear end of the mouse, while the ball 3 of the mouse 1 according to this embodiment is offset toward the leading end of the mouse 1. In other words, when the operator holds the mouse 1, the ball 3 is not positioned on the side of the palm of the hand, but on the side of the fingers, which allows easy visible recognition of the ball 3 and easy checking of the rotating condition of the ball 3. Moreover, when the mouse 1 is operated by moving the hand centered on the wrist laid on the desk, the ball 3 is rotated even by a small movement of the hand, and high operability is obtained.

The technical scope of the present invention is not limited to the above-described embodiment, and various changes may be made without departing from the scope and spirit of the present invention. For example, though the diameter of the hole is smaller than that of the ball in the embodiment, it may be larger. In this case, it is possible to detach the transparent plate from the casing and to take the ball out of the upper side of the casing in performing checking and cleaning of the ball. Furthermore, the number and position of the switch, and the specific shape and dimensions of the mouse may be changed appropriately.

What is claimed is:

1. An input device comprising:

a rotatable ball in contact with an operating surface and rotated by moving the input device on the operating surface;

a rotation detecting section detecting an amount and direction of rotation of said ball and generating a signal corresponding to the detected amount and direction; and an opaque casing containing said ball and said rotation detecting section, said casing having a hole provided on an upper surface of said casing directly above said ball and a detachable transparent plate covering said hole, wherein said upper surface of said casing further includes a concave section shaped like an inverted cone, said hole being disposed in a center of the inverted cone, wherein a diameter of said hole is larger than that of said ball.

2. An input device according to claim 1, wherein said ball is placed offset from the center toward the leading end of said input device.

* * * * *